United States Patent
Nitta

(10) Patent No.: US 8,643,860 B2
(45) Date of Patent: Feb. 4, 2014

(54) IMAGE FORMING APPARATUS PERFORMING NETWORK COMMUNICATION

(75) Inventor: Kenichiro Nitta, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 293 days.

(21) Appl. No.: 13/278,660

(22) Filed: Oct. 21, 2011

(65) Prior Publication Data

US 2012/0105885 A1  May 3, 2012

(30) Foreign Application Priority Data

Oct. 29, 2010  (JP) ................ 2010-243165

(51) Int. Cl.
    *G06K 15/02*  (2006.01)
(52) U.S. Cl.
    USPC ....... 358/1.13; 358/1.14; 358/1.15; 358/1.16; 713/300; 713/320
(58) Field of Classification Search
    USPC ............. 358/1.13, 1.14, 1.15, 1.16, 1.9, 3.28, 358/296; 707/770; 713/320
    See application file for complete search history.

(56) References Cited

U.S. PATENT DOCUMENTS

| 7,209,259 B2 * | 4/2007 | Tomita et al. ................ 358/1.18 |
| 2005/0132181 A1 | 6/2005 | Kashiwada |
| 2005/0216776 A1 * | 9/2005 | Watanabe ..................... 713/300 |
| 2010/0020344 A1 * | 1/2010 | Ohtani ......................... 358/1.13 |
| 2010/0202018 A1 * | 8/2010 | Akiyama et al. ............. 358/1.15 |

FOREIGN PATENT DOCUMENTS

| JP | 7-334476 A | 12/1995 |
| JP | 2000-20492 A | 1/2000 |
| JP | 2001-337936 A | 12/2001 |
| JP | 2005-174156 A | 6/2005 |
| JP | 2010-74256 A | 4/2010 |

OTHER PUBLICATIONS

Office Action from a foreign patent office for a counter-part foreign application dated Jan. 8, 2013.
English Machine Translation of JP 07-334476.
English Machine Translation of JP 2010-74256.
Notice of Decision for Rejection issued to JP Application No. 2010-243165 mailed Jun. 28, 2013.
English Translation of JP 2000-20492 A.
English Translation of JP 2005-174156 A.

\* cited by examiner

*Primary Examiner* — Allen H Nguyen

(57) ABSTRACT

An image forming apparatus having at least a normal mode and an energy saving mode of less energy consumption than the normal mode includes: a main controller executing image processing in the normal mode and stopping operation in the energy saving mode; energy saving controller controlling the image forming apparatus in the energy saving mode; nonvolatile storage unit connected to the main controller; volatile storage unit connected to the main controller and the energy saving controller; and network communication unit connected to the energy saving controller to perform network communication. The nonvolatile storage unit stores a MAC address with which the energy saving controller controls the network communication unit. The main controller writes the MAC address stored in the nonvolatile storage unit into the volatile storage unit during startup of the apparatus. The energy saving controller controls the network communication unit based on the transferred MAC address.

10 Claims, 5 Drawing Sheets

IMAGE FORMING APPARATUS PERFORMING NETWORK COMMUNICATION

CROSS REFERENCE TO RELATED APPLICATIONS

This application is based upon and claims the benefit of priority from corresponding Japanese Patent Application No. 2010-243165, filed in the Japan Patent Office on Oct. 29, 2010, the entire contents of which are incorporated herein by reference.

BACKGROUND OF THE INVENTION

1. Field of the Invention

The present invention relates to an image forming apparatus that performs network communication, and an image forming method.

2. Related Art

It has been known that a typical image forming apparatus has a media access control (MAC) address, which is a unique ID for specifying each device connected to a network, and each device receives packets having a destination MAC address matching its own MAC address.

In addition, another typical image forming apparatus is known to have at least two modes of a normal mode and an energy saving mode in which the energy consumption is less than the normal mode. Such an image forming apparatus may include a main controller that executes image processing in the normal mode and stops operating in the energy saving mode; an energy saving controller that controls the image forming apparatus in the energy saving mode; and a network communication unit that is connected to the energy saving controller and performs network communication.

However, the image forming apparatus equipped with the network communication unit connected to the energy saving controller requires a MAC address in order for the energy saving controller to control the network communication unit. Accordingly, it is required that a nonvolatile storage unit storing this MAC address be connected to the energy saving controller.

On the other hand, the manufacturing cost of the image forming apparatus will decline if the nonvolatile storage unit connected to the energy saving controller is eliminated.

However, in the case of the nonvolatile storage unit storing the MAC address not being connected to the energy saving controller, an image forming apparatus will be required, in which the energy saving controller is configured to control the network communication unit without the nonvolatile storage unit.

SUMMARY OF THE INVENTION

The present disclosure relates to an image forming apparatus that controls a network communication unit by way of an energy saving controller, without a nonvolatile storage unit being connected to an energy saving controller.

An image forming apparatus according to one aspect of the present disclosure includes a normal mode and an energy saving mode in which the energy consumption is less than the normal mode. The image forming apparatus includes: a main controller; energy saving controller; nonvolatile storage unit; volatile storage unit; and network communication unit. The main controller is configured to perform image processing in the normal mode and to stop operating in the energy saving mode. The energy saving controller is configured to control the image forming apparatus in the energy saving mode. The nonvolatile storage unit is configured to be connected to the main controller. The volatile storage unit is configured to be connected to the main controller and the energy saving controller. The network communication unit is configured to be connected to the energy saving controller and to perform network communication.

The nonvolatile storage unit stores a MAC address with which the energy saving controller controls the network communication unit. The main controller writes the MAC address stored in the nonvolatile storage unit into the volatile storage unit at a time of startup of the image forming apparatus. The energy saving controller controls the network communication unit in accordance with the MAC address that is written into the volatile storage unit by the main controller.

According to another aspect of the present disclosure, an image forming method is performed by an image forming apparatus, which includes a normal mode and an energy saving mode, a main controller configured to perform image processing in the normal mode and to stop operating in the energy saving mode, and an energy saving controller configured to operate in the energy saving mode. The image forming method includes:

starting up via the main controller a main controller operating system (OS) at a time of startup of the image forming apparatus;

writing via the main controller a MAC address stored in a nonvolatile storage unit into a volatile storage unit, the nonvolatile storage unit being connected to the main controller, the volatile storage unit being connected to the main controller and the energy saving controller;

writing via the main controller an energy-saving controller operating system (OS) stored in the nonvolatile storage unit into the volatile storage unit and instructing startup of the energy saving controller;

acquiring via the energy saving controller the MAC address stored in the volatile storage unit and initializing a network communication unit to be communicable with the main controller.

Additional features and advantages are described herein, and will be apparent from the following detailed description and the figures.

DETAILED DESCRIPTION OF THE INVENTION

First, the configuration of a Multi-Function Peripheral (MFP) 10, for example, will be explained as an image forming apparatus according to an embodiment of the present invention.

Figure 1:
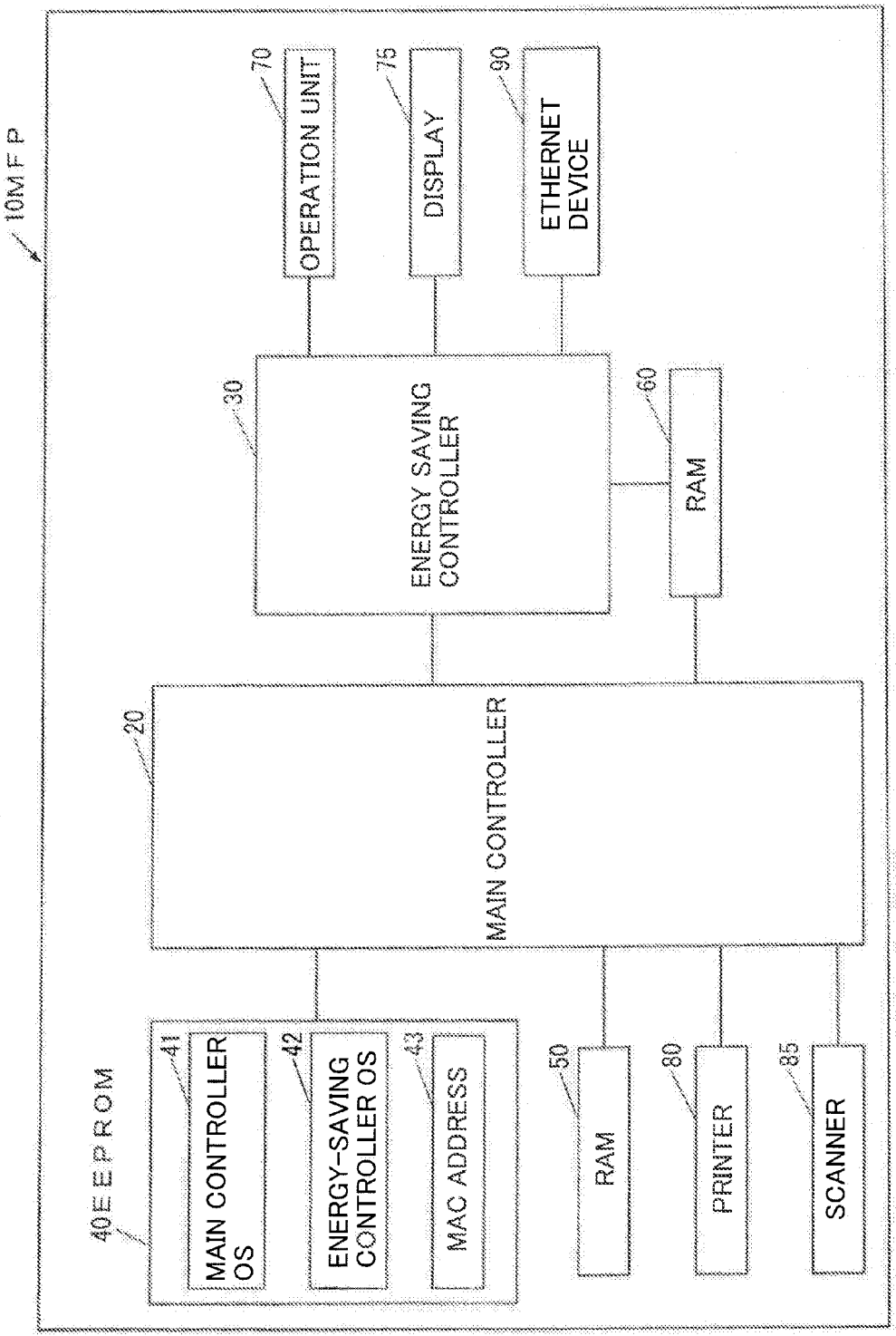
FIG. 1 is a block diagram of a Multi-Function Peripheral (MPF) according to an embodiment of the present invention.

The MFP 10 illustrated in FIG. 1 has at least two modes of a normal mode, and an energy saving mode in which the consumption of energy is less than the normal mode.

The MFP 10 includes a main controller 20, energy saving controller 30, Electrically Erasable Programmable Read Only Memory (EEPROM) 40, Random Access Memory (RAM) 50, RAM 60, operation unit 70, display 75, printer 80, scanner 85, and Ethernet (registered trademark) unit 90. The main controller 20 executes image processing in the normal mode, and stops operating in the energy saving mode. The energy saving controller 30 controls the MFP 10 in the energy saving mode. The EEPROM 40, which serves as a nonvolatile storage unit, is connected to the main controller 20. The RAM 50 is connected to the main controller 20. The RAM 60 serving as a volatile storage unit is connected to the energy saving controller 30. The operation unit 70 is connected to the energy saving controller 30. The operation unit 70 allows a user to input various operations. The display 75 is connected to the energy saving controller 30, and displays various information. The printer 80 is connected to the main controller 20, and executes printing on media such as paper. The scanner 85 is connected to the main controller 20, and is a reading device that reads an original document to generate image data. The Ethernet (registered trademark) unit 90 is connected to the energy saving controller 30, and performs network communication as a network communication unit with an external device such as a personal computer (PC) that is not illustrated, via a network such as a local area network (LAN).

The main controller 20 is connected to the energy saving controller 30 via Peripheral Component Interconnect express (PCIe), for example. The RAM 60 is also connected to the main controller 20 via PCIe, for example.

The EEPROM 40 stores a main-controller operating system (OS) 41 configured for the main controller 20; an energy-saving controller OS 42 configured for the energy saving controller 30; a MAC address 43 with which the energy saving controller 30 controls the Ethernet unit 90; various computer programs (not illustrated) configured for the main controller 20; and various computer programs (not illustrated) configured for the energy saving controller 30. Linux (registered trademark) may be adopted as the main controller OS 41 and the energy-saving controller OS 42, for example.

The RAM 50 and RAM 60 are Double-Data-Rate Synchronous Dynamic Random Access Memory (DDR SDRAM), for example.

The main controller 20 includes a Central Processing Unit (CPU) that uses the RAM 50 as work area.

The energy saving controller 30 includes a CPU that uses the RAM 60 as work area.

The operation unit 70 is an input device of buttons and the like that form a touch panel along with the display 75.

The display 75 is a display unit such as a Liquid Crystal Display (LCD), for example.

The printer 80 is a printing unit that prints various data such as image data generated by the scanner 85 and printing data received from an external device via the Ethernet unit 90, for example.

The Ethernet unit 90 transmits the image data generated by the scanner 85 to the external device, and receives the printing data to be printed by the printer 80 from the external device, for example.

Next, operations of the MFP 10 will be explained.

In the normal mode, the MFP 10 allows the main controller 20 and energy saving controller 30 to operate together to perform various operations such as image processing. On the other hand, in the energy saving mode, the MFP 10 causes operation of the main controller 20 to stop and causes only operation of the energy saving controller 30 to be performed.

Transition from the normal mode to the energy saving mode is performed under a predetermined condition such as when there has been no operation received from a user during a certain period of time. In other words, the main controller 20 stops operating when the predetermined condition has arisen such as no operation having been received from the user during the certain period of time, thereby curbing the consumption of electrical power.

On the other hand, the return from the energy saving mode to the normal mode is performed under a predetermined condition such as when a specific instruction has been input via the operation unit 70, or when the Ethernet unit 90 has received a specific packet of data. In other words, the energy saving controller 30 causes the main controller 20 to operate in a case of the predetermined condition arising such as when the specific instruction has been input via the operation unit 70, or when the Ethernet unit 90 has received the specific packet of data.

Figure 2:
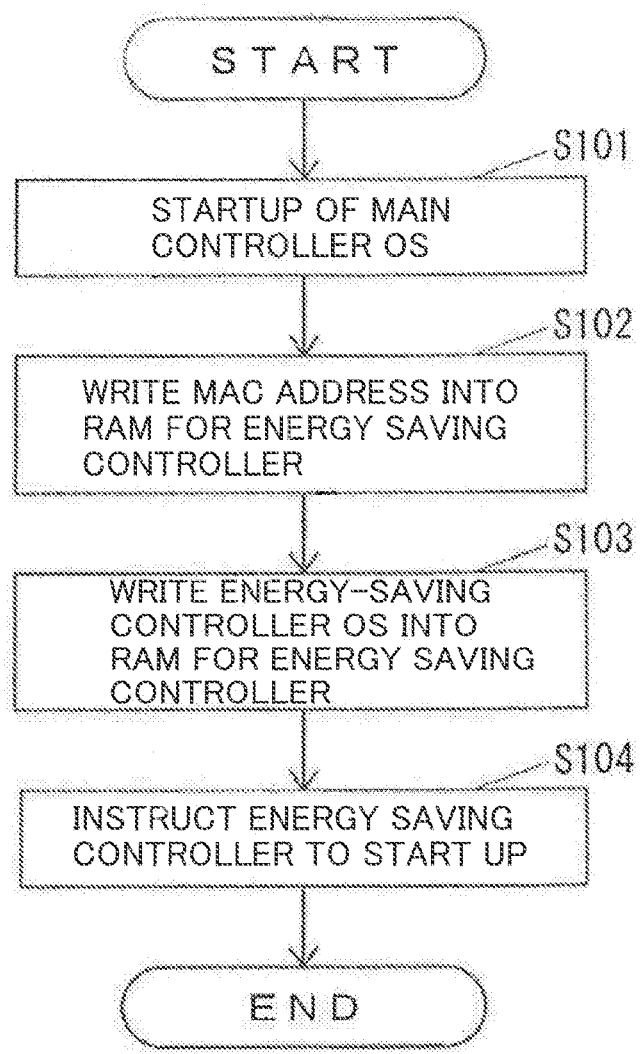
FIG. 2 is a flowchart illustrating operations during startup of a main controller.

FIG. 2 is a flowchart of operations during startup of the main controller 20.

When the power of the MFP 10 is turned on, the CPU of the main controller 20 executes the operations illustrated in FIG. 2.

As shown in FIG. 2, the main controller 20 reads the main controller OS 41 from the EEPROM 40 and causes the main controller OS 41 to start (Step S101).

Figure 3:
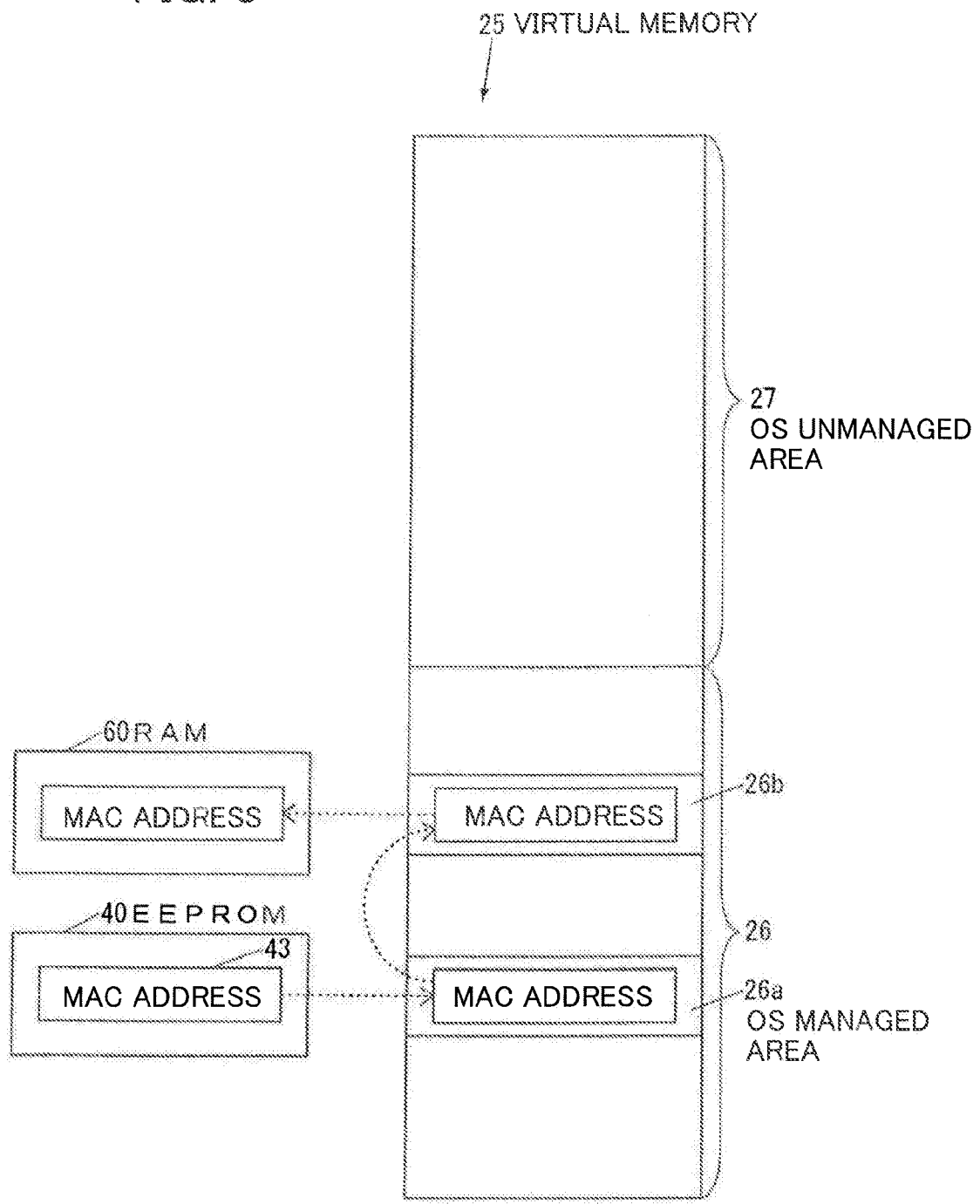
FIG. 3 is a schematic diagram showing a virtual memory of the main controller.

FIG. 3 is a schematic diagram showing a virtual memory 25 of the main controller 20.

As shown in FIG. 3, the virtual memory 25 includes an OS managed area 26, which is a heap area managed by the main controller OS 41, and an OS unmanaged area 27, which is outside the management of the main controller OS 41.

Figure 4:
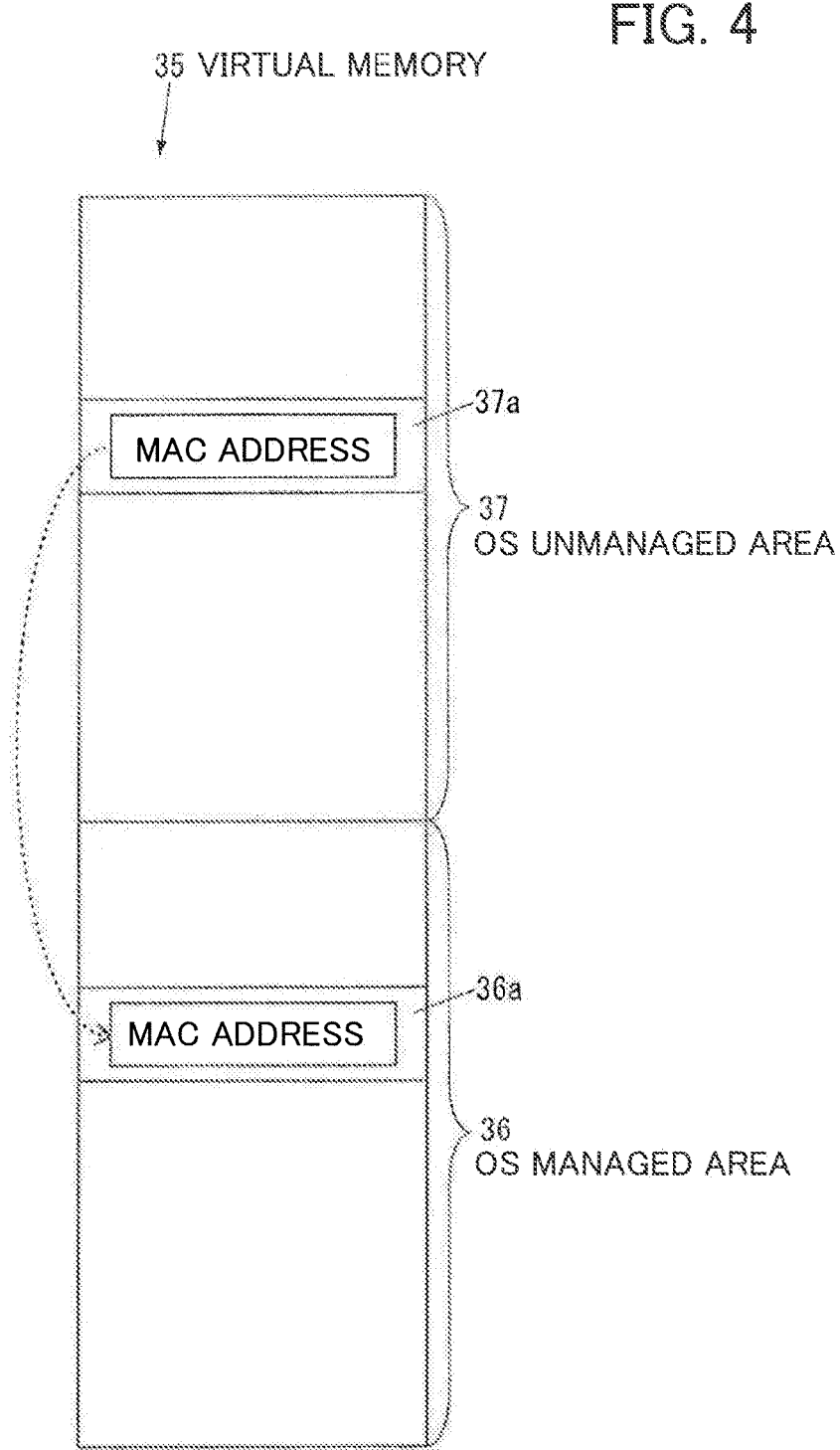
FIG. 4 is a schematic diagram showing a virtual memory of an energy saving controller.

FIG. 4 is a schematic diagram showing a virtual memory 35 of the energy saving controller 30.

As shown in FIG. 4, the virtual memory 35 includes an OS managed area 36, which is a heap area managed by the energy-saving controller OS 42, and an OS unmanaged area 37, which is outside the management of the energy-saving controller OS 42.

As shown in FIG. 2, after the processing of Step S101, the main controller 20 writes the MAC address 43 stored in the EEPROM 40 into the RAM 60 configured for the energy saving controller 30 (Step S102). In other words, the main controller 20 loads the MAC address 43 from the EPPROM 40 into the RAM 50 by performing mapping of an area of the EEPROM 40, in which the MAC address 43 is stored (refer to FIG. 3), to an area 26a of the OS managed area 26 of the virtual memory 25. The main controller 20 performs via PCIe mapping of an area 37a of the RAM 60 that is not managed by the energy-saving controller OS 42 (refer to FIG. 4) to an area 26b of the OS managed area 26 of the virtual memory 25 (refer to FIG. 3), writing the MAC address 43 stored in the area 26a into the area 26b. In this manner, the main controller 20 transfers the MAC address 43 from the RAM 50 to the RAM 60.

After the processing of Step S102, the main controller 20 reads out the energy-saving controller OS 42 from the EEPROM 40 and writes it into the RAM 60 configured for the energy saving controller 30, similarly to the MAC address 43 (Step S103).

Next, the main controller 20 instructs startup to the energy saving controller 30 (Step S104), and then ends the processing illustrated in FIG. 2.

Figure 5:
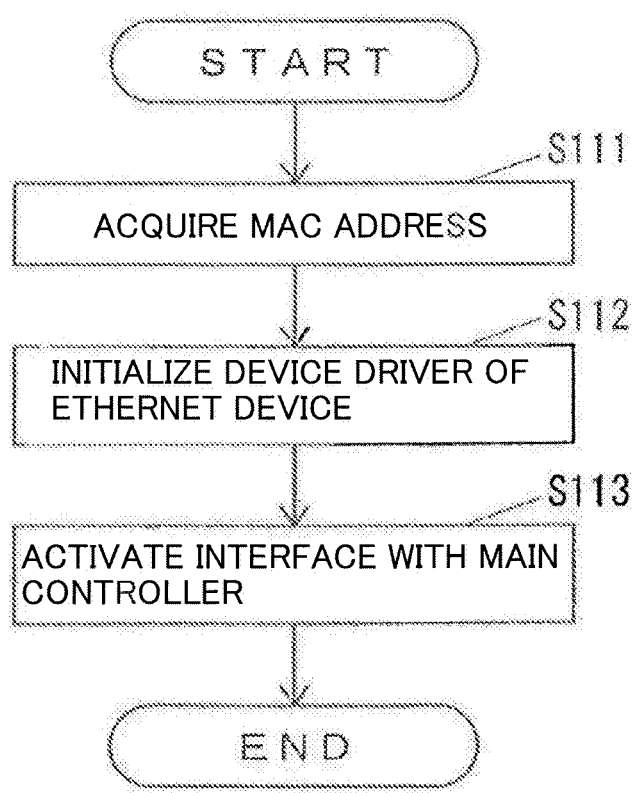
FIG. 5 is a flowchart illustrating operations during startup of an energy-saving controller operating system (OS) configured for the energy saving controller.

FIG. 5 is a flowchart showing operations during startup of the energy-saving controller OS 42 performed by the energy saving controller 30.

Upon receiving an instruction of startup from the main controller 20, the energy saving controller 30 starts up as shown in FIG. 5, based on the energy-saving controller OS 42 written into the RAM 60.

As shown in FIG. 5, the energy saving controller 30 acquires the MAC address 43 written by the main controller 20 in Step S102 into the area 37*a* (refer to FIG. 4) of the OS unmanaged area 37 (Step S111). In other words, the energy saving controller 30 acquires the MAC address 43 by performing mapping of an area of the RAM 60 corresponding to the area 37*a* to an area 36*a* of the OS managed area 36 of the virtual memory 35 (refer to FIG. 4).

Next, the energy saving controller 30 initializes a device driver of the Ethernet unit 90 using the MAC address 43 acquired in Step S111 (Step S112). In other words, the energy saving controller 30 is configured to control the Ethernet unit 90 based on the MAC address 43.

Next, the energy saving controller 30 activates an interface with the main controller 20 (Step S113), and ends the processing illustrated in FIG. 5. After the processing of Step S113, it is possible for the energy saving controller 30 to directly exchange data with the main controller 20.

As explained above, in the MFP 10, the energy saving controller 30 uses the MAC address 43 stored in the EEPROM 40 connected to the main controller 20 through the RAM 60; therefore, the energy saving controller 30 controls the Ethernet unit 90 even though a nonvolatile storage unit storing the MAC address 43 is not connected to the energy saving controller 30.

In addition, the main controller 20 of the MFP 10 writes the MAC address 43 into the area 37*a* in the RAM 60 that is outside the management of the energy-saving controller OS 42 (Step S102), and the energy saving controller 30 starts up based on the energy-saving controller OS 42 written into the RAM 60. Therefore, the MFP 10 prevents the MAC address 43 written into the RAM 60 by the main controller 20 from being corrupted by the energy-saving controller OS 42.

In addition, the EEPROM 40 of the MFP 10 stores the energy-saving controller OS 42. The main controller 20 writes the energy-saving controller OS 42 stored in the EEPROM 40 into the RAM 60 upon startup of the MFP 10 (Step S103). Therefore, the MFP 10 does not require that the nonvolatile storage unit for storing the energy-saving controller OS 42 be connected to the energy saving controller 30.

It should be noted that, although the description has been provided for the MFP 10 as an example of the image forming apparatus according to the present embodiment of the invention, the image forming apparatus may include a copying machine, printer and the like other than the MFP 10.

In addition, although the nonvolatile storage device of the present invention has been described as the EEPROM 40, for example, in the present embodiment, it may include a nonvolatile storage unit other than the EEPROM 40.

What is claimed is:

1. An image forming apparatus including a normal mode and an energy saving mode, comprising:
    a main controller configured to perform image processing in the normal mode and to stop operating in the energy saving mode;
    an energy saving controller configured to control the image forming apparatus in the energy saving mode;
    a nonvolatile storage unit configured to be connected to the main controller;
    a volatile storage unit configured to be connected to the main controller and the energy saving controller; and
    a network communication unit configured to be connected to the energy saving controller and to perform network communication, wherein
    the nonvolatile storage unit stores a MAC address with which the energy saving controller controls the network communication unit,
    the main controller writes the MAC address stored in the nonvolatile storage unit into the volatile storage unit at a time of startup of the image forming apparatus, and
    the energy saving controller controls the network communication unit in accordance with the MAC address that is written into the volatile storage unit by the main controller.

2. The image forming apparatus according to claim 1, wherein
    the main controller writes the MAC address into a storage area of the volatile storage unit, the storage area being outside management performed by an energy-saving controller operating system (OS) configured for the energy saving controller, and
    the energy saving controller starts up in accordance with the energy-saving controller OS that is written into the volatile storage unit.

3. The image forming apparatus according to claim 2, wherein
    the nonvolatile storage unit stores the energy-saving controller OS, and
    the main controller writes the energy-saving controller OS stored in the nonvolatile storage unit into the volatile storage unit at the time of the startup of the image forming apparatus.

4. The image forming apparatus according to claim 3, wherein the energy saving controller becomes communicable with the main controller after the energy-saving controller OS starts up and the network communication unit becomes controllable.

5. The image forming apparatus according to claim 1, wherein
    the main controller is connected to the energy saving controller via a Peripheral Component Interconnect Express (PCIe), and
    the main controller is connected to the volatile storage unit via the PCIe.

6. The image forming apparatus according to claim 1, wherein
    the main controller stops operating when a specific operation does not occur during a predetermined period of time in the normal mode, and
    the energy saving controller controls the image forming apparatus while the main controller stops operating.

7. The image forming apparatus according to claim 6, further comprising an operation unit,
    wherein the energy saving controller causes the main controller to recover when the energy saving controller receives a specific operation instruction via the operation unit.

8. The image forming apparatus according to claim 6, wherein the energy saving controller causes the main controller to recover when the network communication unit receives a specific packet of data.

9. The image forming apparatus according to claim 1, wherein the energy saving controller initializes a device driver of the network communication unit by using the MAC address acquired from the volatile storage unit.

10. An image forming method performed by an image forming apparatus including a normal mode and an energy saving mode, a main controller configured to perform image processing in the normal mode and to stop operating in the energy saving mode, and an energy saving controller configured to operate in the energy saving mode, the method comprising:

starting up via the main controller a main controller operating system (OS) at a time of startup of the image forming apparatus;

writing via the main controller a MAC address stored in a nonvolatile storage unit into a volatile storage unit, the nonvolatile storage unit being connected to the main controller, the volatile storage unit being connected to the main controller and the energy saving controller;

writing via the main controller an energy-saving controller operating system (OS) stored in the nonvolatile storage unit into the volatile storage unit and instructing startup of the energy saving controller; and acquiring via the energy saving controller the MAC address stored in the volatile storage unit, and initializing a network communication unit to be communicable with the main controller.

* * * * *